United States Patent [19]

Meixner et al.

[11] Patent Number: 5,360,863
[45] Date of Patent: Nov. 1, 1994

[54] RADIATION CURABLE COMPOSITIONS AND THEIR USE

[75] Inventors: Jürgen Meixner, Krefeld; Wolfgang Fischer, Meerbusch; Pramod Gupta, Bedburg, all of Germany

[73] Assignee: Bayer Aktiengesellschaft, Leverkusen, Germany

[21] Appl. No.: 101,518

[22] Filed: Aug. 2, 1993

[30] Foreign Application Priority Data

Aug. 11, 1992 [DE] Germany .............................. 4226520

[51] Int. Cl.$^5$ .............................................. C08L 67/06
[52] U.S. Cl. ......................................... 525/28; 525/31; 525/36; 525/39; 525/41; 525/42; 525/44; 525/48
[58] Field of Search ...................... 525/42, 31, 28, 44, 525/48, 39, 36, 41

[56] References Cited

FOREIGN PATENT DOCUMENTS 0122515 3/1984 European Pat. Off. .
2736627 2/1979 Germany .
3319013 11/1984 Germany .

*Primary Examiner*—Patricia A. Short
*Attorney, Agent, or Firm*—Joseph C. Gil; Thomas W. Roy

[57] ABSTRACT

The present invention relates to compositions which may be cured by radical polymerization at room temperature and contain A) 20 to 100 parts by weight of $\alpha,\beta$-ethylenically unsaturated polyesters which are the reaction products of
  a) a dicarboxylic acid component containing i) 40 to 100 carboxyl equivalent % of $\alpha,\beta$ ethylenically unsaturated dicarboxylic acids and/or their anhydrides and ii) 0 to 60 carboxyl equivalent % of dicarboxylic acids and/or their anhydrides other than those set forth in i) with
  b) an alcohol component containing i) 25 to 100 hydroxyl equivalent % of alkoxylated 2-butene-1,4-diols having an average molecular weight 130 to 400 and ii) 0 to 75 hydroxyl equivalent % of mono- or polyhydric alcohols having a molecular weight of 32 to 400 other than those set forth in i) wherein the amounts of a) and b) are chosen such that equivalent ratio of carboxyl groups to hydroxyl groups is no more than 1:1, B) 0 to 80 parts by weight of compounds containing (meth)acryloyl groups and/or vinyl ether groups, wherein the sum of the parts by weight of A) and B) is 100, based on the weight of components A) and B), provided that when components A) and B) are used in a weight ratio exceeding 9:1, component a) contains at least 90 carboxyl equivalent % of component ai) and component b) contains at least 40 hydroxyl equivalent % component bi). The present invention also relates to the use of these compositions as binders for coating, patching or sealing compositions and for the production of molded bodies.

4 Claims, No Drawings

RADIATION CURABLE COMPOSITIONS AND THEIR USE

BACKGROUND OF THE INVENTION

1. Field of the Invention

The present invention relates to new compositions that may be cured by radical polymerization at room temperature and contain olefinically unsaturated polyesters and to their use for the production of coating, patching or sealing compositions or for the production of molded articles.

2. Description of the Prior Art

Known binders based on unsaturated polyesters contain $\alpha,\beta$ ethylenically unsaturated polyesters and monomers copolymerizable therewith. As monomer, styrene is used almost exclusively. Styrene evaporates during processing, which necessitates the expensive purification of the air of the fabrication shops and the waste air of the drying plants.

It has previously been attempted to make available olefinically unsaturated compositions that contain compounds having both (meth)acryloyl groups and partially acrylated polyhydric alcohols, and whose non-esterified hydroxyl groups have been etherified by (meth)allyl alcohol or benzyl alcohol (DE-OS 2,736,627) amenable to curing with metal salts of siccative acids and hydroperoxide. For practical application, however, still shorter curing times are necessary or desirable than are achievable with these systems.

DE-OS 3,319,013 describes di- or polyesters which contain (meth)acryloyl groups and are based on (meth)acrylic acid and alkoxylated 2-butene-1,4-diol. These polyesters may be cured by radiation and also by curing with metal siccatives and hydroperoxides into crosslinkable products. However, because they are produced by azeotropic esterification, only limited variations of the composition and therefore of the properties of the binders produced therefrom is possible. Simultaneously, problems arise from unreacted (meth)acrylic acid as well as from low molecular weight esters of (meth)acrylic acid that can be formed by transesterification from constituents of the polyester. A great disadvantage of such compounds is known to be their toxicity and volatility.

It is an object of the present invention to make available systems that are radical-curable by (hydro)peroxides even at room temperature, that are suitable for the production of monomer-free radical-curable coating compositions or patching compositions as well as molded bodies and that are also equal with regard to the technical properties to the systems of the prior art mentioned without having their disadvantages.

Surprisingly, it has now been found that these objects may be achieved with the $\alpha,\beta$-ethylenically unsaturated polyesters A) which are described in more detail hereinafter or mixtures of these polyesters with compounds B) having (meth)acryloyl groups and/or vinyl ether groups. Polyesters A) are based on a) $\alpha,\beta$-ethylenically unsaturated dicarboxylic acids and/or their anhydrides and b) alkoxylated 2-butene-1,4-diol. They can be crosslinked both by means of radical formers, such as peroxides, and also by radiation curing.

SUMMARY OF THE INVENTION

The present invention relates to compositions which may be cured by radical polymerization at room temperature and contain A) 20 to 100 parts by weight of $\alpha,\beta$-ethylenically unsaturated polyesters which are the reaction products of
 a) a dicarboxylic acid component containing
  i) 40 to 100 carboxyl equivalent % of $\alpha,\beta$ ethylenically unsaturated dicarboxylic acids and/or their anhydrides and
  ii) 0 to 60 carboxyl equivalent % of dicarboxylic acids and/or their anhydrides other than those set forth in i) with
 b) an alcohol component containing
  i) 25 to 100 hydroxyl equivalent % of alkoxylated 2-butene-1,4-diols having an average molecular weight 130 to 400 and
  ii) 0 to 75 hydroxyl equivalent % of mono- or polyhydric alcohols having a molecular weight of 32 to 400 other than those set forth in i)
 wherein the amounts of a) and b) are chosen such that the equivalent ratio of carboxyl groups to hydroxyl groups is no more than 1:1,
0 to 80 parts by weight of compounds containing (meth)acryloyl groups and/or vinyl ether groups, wherein the sum of the parts by weight of A) and B) is 100, based on the weight of components A) and B), provided that when components A) and B) are used in a weight ratio exceeding 9:1, component a) contains at least 90 carboxyl equivalent % of component ai) and component b) contains at least 40 hydroxyl equivalent % component bi).

The present invention also relates to the use of these compositions as binders for coating, patching or sealing compositions and for the production of molded bodies.

DETAILED DESCRIPTION OF THE INVENTION

The essential binder components of the compositions according to the invention are either exclusively polyesters A) or, preferably, mixtures of polyesters A) with compounds B) having (meth)acryloyl groups and/or vinyl ether groups.

Instead of using polyesters A) that contain both $\alpha,\beta$-ethylenically unsaturated dicarboxylic acid groups and alkoxylated 2-butene-1,4-diol groups, it is also possible in another embodiment of the present invention to use mixtures of (i) polyesters having $\alpha,\beta$-ethylenically unsaturated dicarboxylic acid groups but no alkoxylated butane diol groups with (ii) polyesters having alkoxylated 2-butene-1,4-diol groups but no $\alpha,\beta$-ethylenically unsaturated dicarboxylic acid groups, provided that the mixture satisfies the preceding requirements with regard to the percentages by weight of the various components and the carboxyl/hydroxyl equivalent ratio.

The acid component a) that is used for the production of the unsaturated polyesters A) contains 40 to 100 carboxyl equivalent % of $\alpha,\beta$-ethylenically unsaturated dicarboxylic acids and/or their anhydrides. However, when components A) and B) are used in a weight ratio exceeding 9:1, in particular when unsaturated polyesters A) are exclusively used (i.e., component B) is not present), acid component a) contains at least 90 carboxyl equivalent %, preferably 100 carboxyl equivalent % of $\alpha,\beta$-ethylenically unsaturated dicarboxylic acids or their anhydrides. Preferred $\alpha,\beta$-ethylenically unsaturated dicarboxylic acids or dicarboxylic acid anhydrides are those having 4 to 5 carbon atoms such as maleic acid, fumaric acid, itaconic acid or maleic anhydride. Fumaric acid, maleic acid and/or maleic anhydride are preferred. Fumaric acid is particularly preferred.

The acid component a) can contain, in addition to the α,β-olefinically unsaturated dicarboxylic acids or their anhydrides, up to 60 carboxyl equivalent % of other dicarboxylic acids or dicarboxylic acid anhydrides other than those defined above. Examples include saturated aliphatic dicarboxylic acids having 4 to 10 carbon atoms such as succinic acid, adipic acid, sebacic acid and/or the anhydrides of such acids; cycloaliphatic dicarboxylic acids or dicarboxylic acid anhydrides having 8 to 10 carbon atoms such as tetrahydrophthalic acid, hexahydrophthalic acid, norbornene dicarboxylic acid or their anhydrides; and aromatic dicarboxylic acids or dicarboxylic acid anhydrides having 8 to 12 carbon atoms such as phthalic acid, phthalic anhydride, isophthalic acid or terephthalic acid; of the aromatic dicarboxylic acids or anhydrides phthalic acid or phthalic anhydride are preferred.

The alcohol component b) on which the polyesters A) are based contains 25 to 100 hydroxyl equivalent % of alkoxylated 2-butene-1,4-diols having an average molecular weight of 130 to 400. The remainder of this component is selected from mono- or polyhydric alcohols having a molecular weight of 32 to 400 other than those defined above, provided that when components A) and B) are used in a weight ratio exceeding 9:1, component b) contains at least 40 hydroxyl equivalent % of alkoxylated 2-butene-1,4-diol.

The term "alkoxylated" refers to addition products of ethylene oxide and/or propylene oxide to 2-butene-1,4-diol. The "alkoxylated" 2-butene-1,4-diol used according to the invention are 1- to 5-fold, preferably 2- to 4-fold alkoxylated compounds, i.e., addition products having ether groups which are prepared using an average of 1 to 5, preferably 2–4, moles of alkylene oxide per mole of butene diol. Particularly preferred alkoxylated butene diols are 2- to 4-fold ethoxylated or 2- to 4-fold propoxylated 2-butene-1,4-diol. Since during alkoxylation, mixtures of homologs are always formed, the molecular weight ranges are based on the average molecular weight, which is calculated from the OH functionality and the OH content.

Examples of the other alcohols that may be used as a portion of alcohol component b) include are preferably dihydric alcohols having 2 to 10, preferably 2 to 4 carbon atoms, and which may optionally contain ether groups. Examples include ethylene glycol, diethylene glycol and propylene glycol. Also suitable are monohydric alcohols having 1 to 12 carbon atoms such as methanol, ethanol, n-hexanol, isooctanol, isododecanol and benzyl alcohol.

In the production of polyesters A), the carboxyl component a) and the alcohol component b) are used in amounts sufficient to provide an equivalent ratio of carboxyl groups to hydroxyl groups of no more than 1:1, preferably of 0.6:1 to 1:1.

The unsaturated polyesters can be produced by known methods, e.g., by melt esterification of the alcohols and acids or their esterifiable derivatives, cf. "Methoden der organischen Chemie" (Houben-Weyl), 4th Edition, vol. 14/2, Georg Thieme Verlag, Stuttgart 1961, p. 1–5, 21–33, 40–44. The esterification is preferably carried out under an inert gas atmosphere at temperatures of 140° to 220° C.

The unsaturated polyesters A) have acid numbers of 0 to 50, preferably 5 to 40, and hydroxyl numbers of 10 to 150, preferably 10 to 130 mg KOH/g. Polyester A) has a number average molecular weight ($M_n$, as determined by gel permeation chromatography using polystyrene as standard) of 300 to 5000, preferably 400 to 4000.

In order to prevent the unsaturated polyester A) from undergoing undesired premature cross-linking it is advisable, during the production of the ester, to add 0.001 to 0.1 wt % of polymerization inhibitors or antioxidants. Suitable stabilizers are described in "Methoden der organischen Chemie" (Houben-Weyl), 4th Edition, vol. 14/1, p. 433 ff. Georg Thieme Verlag, Stuttgart 1961. Toluhydroquinone, for example, is very suitable at a concentration of 0.01 to 0.05 wt %, based on the weight of the unsaturated polyesters.

Compounds B) are selected from compounds containing (meth)acryloyl groups and/or vinyl ether groups. The compounds containing (meth)acryloyl groups are generally known polyester-, polyether-, epoxy- or urethane(meth)acrylates or their mixtures, as described e.g. in S.P. Pappas "U.V. Curing: Science and Technology" I and II, Technology Marketing Corporation, Stamford, Connecticut, 1978 and 1985 or in R. Holman, P. Oldring (eds.) "UV+EB Curing Formulations for Printing Inks, Coatings and Paints", Sita Technology, London 1988. Particularly suitable compounds containing (meth)acryloyl groups are low-viscosity compounds having at least two acrylate or methacrylate groups per molecule and a molecular weight of 170 to 1000. Examples include the bis-acrylic acid or methacrylic acid esters of ethylene glycol, 1,4-butanediol and 1,6-hexanediol; the tris-acrylic acid or methacrylic acid esters of glycerol, trimethylolpropane and pentaerythritol; the tetrakis-acrylic acid or methacrylic acid esters of pentaerythritol; and the acrylic acid or methacrylic acid esters of the polyether alcohols which correspond to the polyhydric alcohols and may be obtained in known manner by the alkoxylation of these polyhydric alcohols using propylene oxide and/or ethylene oxide.

Suitable compounds containing vinyl ether groups are those having a molecular weight of 72 to 500 and one or two vinyl groups per molecule, such as vinyl isobutyl ether, cyclohexyl vinyl ether, 1,4-butanediol divinyl ether, triethyleneglycol divinylether and 1,4-bis-hydroxymethylcyclohexanedivinyl ether.

According to the intended use and depending on the viscosity, the compositions according to the invention can be mixed, with known additives C). These include fillers, pigments, dyestuffs, thixotroping agents, smoothing agents, delustering agents and levelling agents. In particular for the production of coatings, the compositions according to the invention may be used in the form of solutions in known lacquer solvents such as acetone, butyl acetate and xylene.

These solvents can be used in amounts of up to 70 wt %, preferably up to 60 wt %, based on the total weight of the compositions according to the invention, including solvent.

The compositions according to the invention are cured, optionally after evaporation of volatile auxiliary substances such as inert solvents, either by means of high-energy radiation, such as UV light, electron beam or gamma rays or by curing with siccatives, optionally in combination with (hydro)peroxides, at temperatures between room temperature and 250° C.

The siccatives are selected from cobalt, lead or manganese salts of acids such as linseed oil fatty acid, naphthenic acid, acetic acid and isooctanoic acid. They are used, if at all, in amounts such that the metal content, based on the weight of the products according to the invention, is 0.001 to 1 wt %.

Suitable (hydro)peroxides include dicumyl peroxide, di-tert-butyl peroxide, benzoyl peroxide, cyclohexanone peroxide, methyl ethyl ketone peroxide, acetylacetone peroxide, dinonyl peroxide, bis(4-tert-butylcyclohexyl) peroxydicarbonate, tert-butyl hydroperoxide, 2,5-dimethylhexane-2,5-hydroperoxide and diisopropylbenzene monohydroperoxide. These (hydro)peroxides are preferably used in amounts of 0.5 to 10 wt %, based on the weight of the compositions according to the invention.

The addition of other compounds that can initiate start a crosslinking reaction through the formation of radicals is also possible. Further, it is possible to carry out a combination of a crosslinking started by (hydro)peroxides and one occurring by high-energy radiation in order, e.g., to obtain a pigmented coating having good covering power according to DE-OS 3,612,422.

The compositions according to the invention are generally clear, low- to high-viscosity liquids. The conversion to cured plastics occurs in general after shaping.

The term "shaping" is intended within the framework of the invention to include both the production of three-dimensional cured molded articles, cured adhesive cements, patching compounds and flat shaped articles, in particular cured lacquer coatings. The compositions according to the invention are particularly preferred for use as binders for the production of coatings on paper, cardboard products, leather, wood, plastics, nonwoven fabric, textiles, ceramic materials, mineral materials, glass, metal and synthetic leather and as binders for patching and sealing compositions.

The following examples are used to further illustrate the invention. All parts and percentages are by weight unless otherwise indicated.

EXAMPLES

Unsaturated Polyester Resins A

The starting components set forth in Table I were subjected to melt condensation together with 0.02% of toluhydroquinone at 160° to 180° C. in a nitrogen stream until the indicated acid number and viscosity were reached.

TABLE 1

| Unsaturated Polyesters | A1 | A2 | A3 | A4 | A5 | A6 | A7 | A8 | A9 |
|---|---|---|---|---|---|---|---|---|---|
| Weighed-in quantity (mol) | | | | | | | | | |
| Dicarboxylic acid component a) | | | | | | | | | |
| Fumaric acid | 1.0 | 1.0 | 1.0 | | 0.5 | 1.0 | 1.0 | 1.0 | 0.2 |
| Maleic anhydride | | | | 1.0 | | | | | |
| Phthalic anhydride | | | | | 0.5 | | | | 0.8 |
| Alcohol component b) | | | | | | | | | |
| 2-fold ethoxylated 2-butene-1,4-diol | 0.7 | | | 0.7 | 0.7 | 0.75 | | 0.2 | 0.7 |
| 4-fold ethoxylated 2-butene-1,4-diol | | 0.7 | | | | | | | |
| 2-fold propoxylated 2-butene-1,4-diol | | | 0.7 | | | | | | |
| Reaction product from 1 mol 2-butene-1,4-diol and 2 mol caprolactone | | | | | | | 0.7 | | |
| Ethylene glycol | 0.5 | 0.5 | | 0.5 | 0.5 | | 0.5 | 1.0 | 0.5 |
| 1,2-Propylene glycol | | | | | | 0.88 | | | |
| Benzyl alcohol | 0.3 | 0.3 | 0.3 | 0.3 | 0.3 | | 0.3 | 0.3 | 0.3 |
| Properties of the polyester | | | | | | | | | |
| Acid number (mg KOH/g) | 15 | 11 | 17 | 25 | 36 | 10 | 17 | 20 | 35 |
| Viscosity (23° C., mPa · s) | 10100 | 9600 | 9800 | 9600 | 9700 | 9300 | 9700 | 10500 | 10600 |

When crosslinking by means of UV irradiation it is necessary to add photoinitiators to the coating composition as component C) or as part of component C).

Suitable photoinitiators are those such described, for example, in Houben-Weyl, Methoden der organischen Chemie, vol. E 20, pages 80 ff, Georg Thieme Verlag, Stuttgart 1987. Preferred photoinitiators include benzoin ethers such as benzoin isopropyl ether; benzil ketals such as benzil dimethyl ketal; and hydroxyalkylphenones such as 2-hydroxy-2-methyl-1-phenyl-1-propan-1-one.

The photoinitiators are generally used in amounts of 0.1 to 10 wt %, preferably 0.1 to 5 wt %, based on the weight of the products according to the invention. They can be used individually or, because of advantageous synergistic effects, they may also be used as mixtures.

EXAMPLES 1 TO 10 ACCORDING TO THE INVENTION

Components A) and B) in the amounts set forth in Table 2 were mixed, and in each example 3% of methyl ethyl ketone peroxide and 2% of cobalt isooctanoate solution (metal content 2.2%) were added. The resulting compositions were spread with a doctor blade (at 90 μm film thickness) onto glass plates and dried at room temperature. After 4 hours, tack-free coatings with loadable film surfaces were obtained.

TABLE 2

| | Examples according to the invention | | | | | | | | | |
|---|---|---|---|---|---|---|---|---|---|---|
| | 1 | 2 | 3 | 4 | 5 | 6 | 7 | 8 | 9 | 10 |
| Weighed-in quantity (%) | | | | | | | | | | |
| Component A | | | | | | | | | | |
| Unsaturated polyester A1 | 70 | 70 | 70 | 70 | | | | | | 100 |

TABLE 2-continued

| | Examples according to the invention | | | | | | | | | |
|---|---|---|---|---|---|---|---|---|---|---|
| | 1 | 2 | 3 | 4 | 5 | 6 | 7 | 8 | 9 | 10 |
| Unsaturated polyester A2 | | | | | 70 | | | | | |
| Unsaturated polyester A3 | | | | | | 70 | | | | |
| Unsaturated polyester A4 | | | | | | | 70 | | | |
| Unsaturated polyester A5 | | | | | | | | 70 | | |
| Unsaturated polyester A6 | | | | | | | | | 70 | |
| Component B | | | | | | | | | | |
| 4-fold ethoxylated pentaerythritol tetraacrylate | 30 | | | | 30 | 30 | 30 | 30 | 30 | |
| 4-fold ethoxylated trimethylolpropane triacrylate | | 30 | | | | | | | | |
| 4-fold ethoxylated trimethylolpropane trimethacrylate | | | 30 | | | | | | | |
| Triethylene glycol divinyl ether | | | | 30 | | | | | | |

COMPARATIVE EXAMPLES 11 TO 15

Components A) and B) in the amounts set forth in Table 2 were mixed, and in each example 3% of methyl ethyl ketone peroxide and 2% of cobalt isooctanoate solution (metal content 2.2%) were added. The resulting compositions were spread with a doctor blade (at 90 μm film thickness) onto glass plates and dried at room temperature. In contrast to the examples according to the invention, the coatings after 4 hours were still tacky to wet.

TABLE 3

| | Comparison Examples | | | | |
|---|---|---|---|---|---|
| | 11 | 12 | 13 | 14 | 15 |
| Weighed-in quantity (%) | | | | | |
| Component A | | | | | |
| Unsaturated polyester A5 | 100 | | | | |
| Unsaturated polyester A7 | | 70 | | | |
| Unsaturated polyester A8 | | | 70 | | |
| Unsaturated polyester A9 | | | | 70 | |
| Component B | | | | | |
| 4-fold ethoxylated pentaerythritol tetraacrylate | — | 30 | 30 | 30 | 100 |

Comparison Example 11 demonstrates that when using a polyester A) whose acid component a) contains less than 90 carboxyl equivalent % of α,β-unsaturated dicarboxylic acids, the simultaneous use of component B) cannot be dispensed with.

The polyester of Comparison Example 12 was not prepared from the reaction product of 2-butene-1,4-diol with ethylene oxide or propylene oxide, but rather the reaction product of 2-butene-1,4-diol with caprolactone. This coating composition of this example did possess an acceptable cure rate.

The polyesters of Comparison Examples 13 and 14 were prepared using less than the required amounts of alkoxylated 2-butene-1,4-diol and α,β-ethylenically unsaturated dicarboxylic acids, respectively. Again, these coating compositions did not possess an acceptable cure rate.

Comparison Example 15 shows that Component B) alone is not sufficient to satisfy the objectives of the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which may be cured by radical polymerization at room temperature and comprises
   A) 30 to 80 parts by weight of an unsaturated polyester component consisting essentially of one or more α,β-ethylenically unsaturated polyesters which are the reaction products of
      a) an acid component consisting essentially of
         i) 40 to 100 carboxyl equivalent % of one or more α,β-ethylenically unsaturated dicarboxylic acids and/or their anhydrides and
         ii) 0 to 60 carboxyl equivalent % of one or more dicarboxylic acids and/or their anhydrides other than those set forth in i) with
      b) an alcohol component containing
         i) 25 to 100 hydroxyl equivalent % of one or more alkoxylated 2-butene-1,4-diols having an average molecular weight 130 to 400 and
         ii) 0 to 75 hydroxyl equivalent % of one or more mono- or polyhydric alcohols having a molecular weight of 32 to 400 other than those set forth in i), wherein the amounts of a) and b) are chosen such that the equivalent ratio of carboxyl groups to hydroxyl groups is no more than 1:1,
   B) 20 to 70 parts by weight of compounds containing (meth)acryloyl groups and/or vinyl ether groups, wherein the sum of the parts by weight of A) and B) is 100, based on the weight of components A) and B).

2. The composition of claim 1 wherein component a)i) contains fumaric acid.

3. A coating, patching sealing composition containing the composition of claim 1 as binder.

4. A molded article prepared from the composition of claim 1.

* * * * *